United States Patent [19]
Lehureau et al.

[11] Patent Number: 5,566,982
[45] Date of Patent: Oct. 22, 1996

[54] FLEXIBLE CARD WITH VALIDITY CHECKING DEVICE

[75] Inventors: Jean C. Lehureau, Ste Genevieve Des Bois; Francis Massie, Paris; Claude Bricot, Villejuif, all of France

[73] Assignee: Idmatics S. A., Colombes, France

[21] Appl. No.: 275,530

[22] Filed: Jul. 15, 1994

[30] Foreign Application Priority Data

Jul. 16, 1993 [FR] France .................................. 93 08759

[51] Int. Cl.⁶ .................................................. B42D 15/00
[52] U.S. Cl. ................................................ 283/83; 283/91
[58] Field of Search ............................... 283/83, 94, 72, 283/91, 82, 904

[56] References Cited

U.S. PATENT DOCUMENTS

| | | | |
|---|---|---|---|
| 4,223,918 | 9/1980 | Smoczynski | 283/83 |
| 4,579,371 | 4/1986 | Long et al. | 283/83 |
| 4,763,927 | 8/1988 | Schneider | 283/83 X |
| 4,792,667 | 12/1988 | Chen . | |

FOREIGN PATENT DOCUMENTS

| | | |
|---|---|---|
| 0166273 | 1/1986 | European Pat. Off. . |
| 2554122 | 3/1985 | France . |

*Primary Examiner*—Willmon Fridie, Jr.
*Attorney, Agent, or Firm*—Oblon, Spivak, McClelland, Maier & Neustadt, P.C.

[57] ABSTRACT

An identity card or credit card type of card is equipped with a validity-checking device that makes it possible to do away with the use of complementary, sophisticated checking equipment. It results from the association of a structure $S_1$ comprising at least one layer of piezoelectric material and a structure $S_2$ comprising a material capable of switching electrically between two optical states (I) and (II) that are different in terms of ocular perception. During the bending of the card, the validity or non-validity of the card can be attested to by the appearance or non-appearance of the validity of the card.

10 Claims, 3 Drawing Sheets

FLEXIBLE CARD WITH VALIDITY CHECKING DEVICE

BACKGROUND OF THE INVENTION

1. Field of the Invention

The field of the invention is that of cards containing official information, for example identity cards, residence permits or credit cards.

More specifically, it relates to cards whose validity may be authenticated by means of the very configuration of the card, without having recourse to complementary equipment. For, the cards according to the invention include a validity checking device that can be activated by a simple external action of the mechanical flexion or bending type.

2. Description of the Prior Art

At present, the devices used to test the validity of the card make use of sophisticated complementary checking equipment. The cards may be, for example, cards that may contain a magnetic identification track which assumes the existence of reading means and of a file-interrogation procedure. These cards may include fluorescent elements identifiable by means of an UV lamp or multiple-photon mechanisms in rare earths that require the use of a laser at a specific wavelength. The use of holograms also enables the checking of the cards. However, these holograms are easily reproducible, once the first one has been made.

SUMMARY OF THE INVENTION

This is why the invention proposes a type of flexible card that can be simply flexed or bent to reveal a piece of information. The validity or non-validity of the card is attested to by the appearance or non-appearance of this piece of information. This appearance of information occurs in the card or may typically be revealed by a change from a light-scattering state to a transparent state on which there may also be superimposed a diffracting or scattering state, the structure of the flexible card making it possible to envisage different changes of optical states that can be detected with the naked eye. More specifically, the flexible card according to the invention comprises, inserted between flexible electrodes, a structure $S_1$ comprising at least one layer of piezoelectric material, a structure $S_2$ comprising a layer of material capable of switching electrically between two optical states (I) and (II) that are different in terms of ocular perception, said structures $S_1$ and $S_2$ being electrically connected. Thus, through the presence of a piezoelectric material capable of generating charges under the effect of a mechanical stress of the pressure type, it is possible to generate the changing of optical states by transferring these charges to the structure $S_2$. The structures $S_1$ and $S_2$ may advantageously be juxtaposed in one and the same plane, with continuous electrodes on either side of these structures providing for the transfer of the charges from the piezoelectric material up to the electrooptical material.

The electrooptical material may be of the polymer-based composite material type in which there are dispersed liquid crystal globules capable of changing from a light-scattering state to a transparent state under the effect of an electrical field, or conversely from a transparent state to a light-scattering state.

The liquid crystal may advantageously be a nematic liquid crystal having oblong particles that get oriented in parallel to a preferred axis. The ellipsoid of the indices of such molecules does not show any spherical symmetry and two optical indices are defined in a standard way, the ordinary optical index $n_o$ in a direction perpendicular to the large axis of the molecule, and the extraordinary index $n_e$ in a parallel direction. Thus, by choosing a liquid crystal material having an index $n_e$ identical to that of the polymer matrix, it is possible to obtain a transparent state under an electrical field.

The structure $S_1$ may advantageously comprise two polarized films $F_1$ and $F_2$ made of piezoelectric polymer material, said films having opposite directions of polarization. As shall be explained further below, such a configuration provides such a structure with increased piezoelectric sensitivity.

Typically, the card according to the invention may include information elements recorded on one face with an element called a window, inserted in the card or an aperture (0) corresponding to a double window enabling the verification of the card by transparency. This window is located in the structure $S_1$ and is capable of passing from a non-transparent optical state I to an optical state II revealing an information element that enables the authenticity of the card to be checked.

BRIEF DESCRIPTION OF THE DRAWINGS

The present invention will be understood more clearly and other advantages will appear from the following description, given as a non-restrictive example, and from the appended figures of which:

FIG. 1 illustrates an exemplary card according to the invention;

MORE DETAILED DESCRIPTION

Figure 1A:
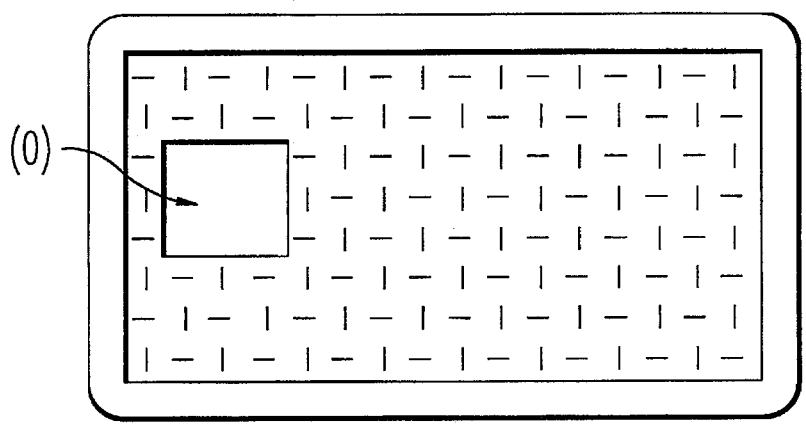
Figure 1a gives a schematic top view.
Figure 1B:
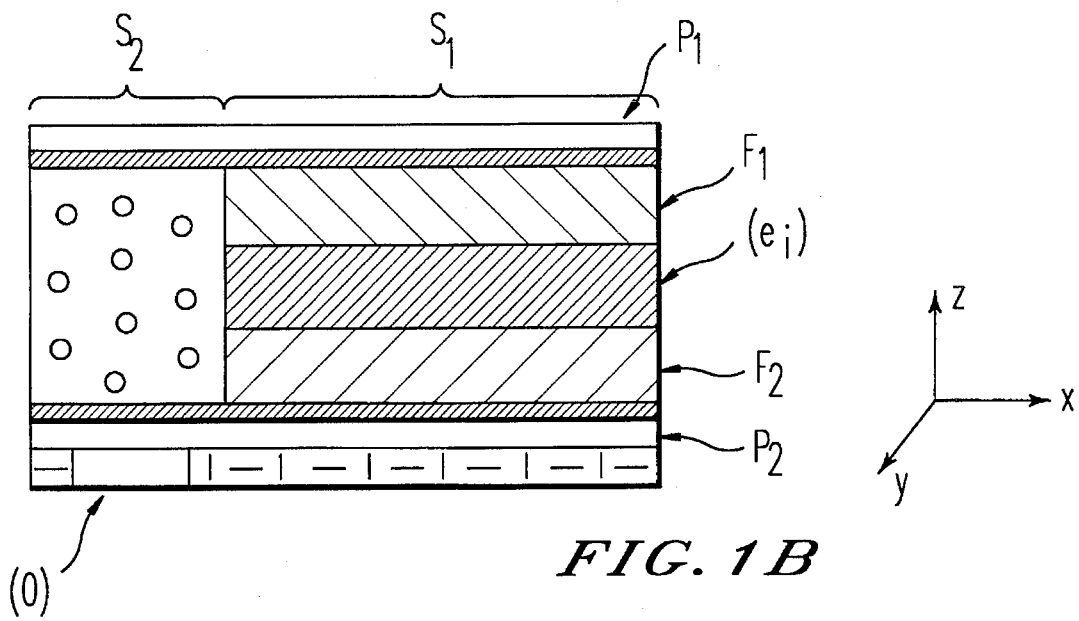
FIG. 1b gives a schematic view of a section of the card.

The flexible card according to the invention may advantageously include a structure $S_1$ and a structure $S_2$, juxtaposed in one and the same plane as shown in FIG. 1b. This type of configuration enables the use of a piezoelectric material which may or may not be transparent, the effect of transparency being then sought only locally in the structure $S_2$. The flexible card illustrated in FIGS. 1a and 1b is formed by two flexible plastic substrates $P_1$ and $P_2$ covered with transparent electrodes that may be made of indium tin oxide. The structure $S_1$ may be formed by two thin films of piezoelectric polymer having opposite polarization and being separated by an intermediate and flexible electrode.

Figure 2:
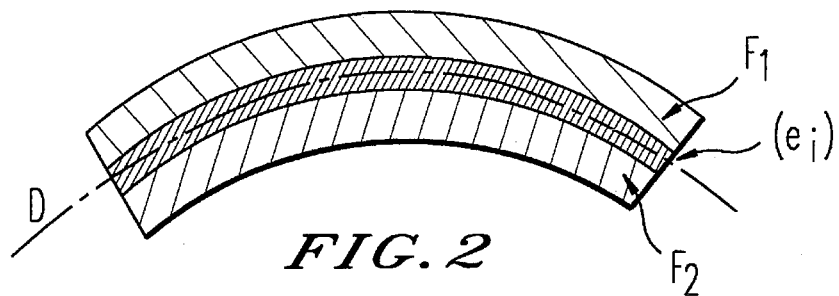
FIG. 2 illustrates the flexing or bending of an exemplary structure $S_1$ using two films of piezoelectric material having opposite polarization.
Figure 3:
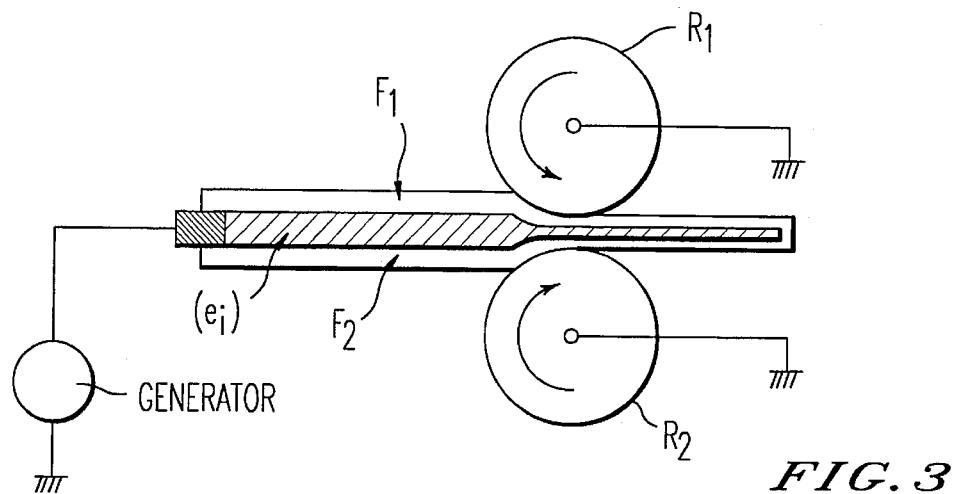
FIG. 3 illustrates an exemplary embodiment of a structure $S_1$ using two films of piezoelectric material with opposite polarization, by simultaneous colamination and polarization.

Thus, during the bending of the card and hence, the bending of the structure $S_1$, there is obtained a film $F_1$ in a state of extension and a film $F_2$ in a state of contraction as can be seen in FIG. 2. The piezoelectric coefficients perpendicular to the axis of the deformation D and on either side of this axis of deformation D may be added up by means of the opposite polarizations of the films $F_1$ and $F_2$ unlike in the case of a single film of homogenous piezoelectric material whose axis of deformation is located at the center. Typically, this set of two thin films made of piezoelectric polymer may be obtained by lamination. More precisely, to obtain the structure $S_1$ resulting from the association of the two films $F_1$ and $F_2$ separated by an intermediate electrode (ei) needed for the polarization operation, it is possible, in an initial stage, to make a preliminary conductive electrode on two polymer strips. These strips are then pressed together and a unit is obtained, formed by said strips with a central electrode (ei) between them. In a second stage, it is possible, in a single step, to carry out the lamination and the polarization of this unit to arrive at the final structure $S_1$. FIG. 3 illustrates this operation. The unit is put through a rolling mill which is constituted chiefly by two conductive rollers $R_1$ and $R_2$ rotating in the direction indicated by the arrows. To obtain remanent polarizations having opposite directions with respect to the intermediate electrode (ei), it is possible to place the two rolliers at the ground potential.

The structure $S_1$ thus obtained may be inserted between the electorodes of the substrates $P_1$ and $P_2$ whose dimension along the axis x is greater than that of the structure $S_1$. It is then possible, by capillarity, to introduce a monomer liquid mixture of liquid crystal, said monomer being photopolymerizable and the polymer thus formed being non-miscible with the liquid crystal. The structure $S_2$, thus made, is constituted by polymer containing liquid crystal globules. On one of the flexible substrates, there is placed a coating comprising a set of information elements. A window or aperture (0) may be made in this coating to reveal the change in the optical state of the flexible card. Indeed, when there is no bending of the card, the unit ($S_2$) is in a light-scattering state or is even dark if molecules of dye have been introduced into the liquid crystal. The aperture (0) is therefore a neutral element of the card that does not give any particular information elements. During the bending of the card, and hence of the films of piezoelectric materials, surface changes appear at $P_1$ and $P_2$. These surface changes will address the liquid crystal molecules and orient them to give a transparent state, leading to a transparent aperture. (0). It is possible to add on a particular information element facing the window (0), this particular information element being revealed solely during bending and being located on the opposite substrate.

Typically, the structure $S_1$ may comprise a PVDF dimorphic structure formed by two films having a thickness of 25 μm, the bending of which can be used to develop a voltage close to 50 V. This voltage applied to a 2 $cm^2$ sample of polymer with a thickness of 50 μpm, in which liquid crystal globules are dispersed, enables a change from a light-scattering state to a transparent state.

In order to increase the complexity of the device according to the invention so as to prevent the falsification of cards for official use, it is possible to create changes in optical state of greater sophistication through the introduction of an additional element that is difficult to reproduce.

It is thus possible, in the structure $S_2$, to create an amplitude grating of metal electrode lines that are very thin and have a pitch that is typically in the range of about 10 microns, said grating being made at the aperture (0). Thus, the transparent state becomes a diffractive state making it possible to show several images corresponding to orders of diffraction and no longer just one image as in the previous example. The making of such a grating calls for complicated technologies that require etching and masking operations. The making of such cards then becomes a painstaking task: this limits possible cases of forgery but in no way affects the possibility of making simple and immediate checks on the validity of the card.

Figure 4:
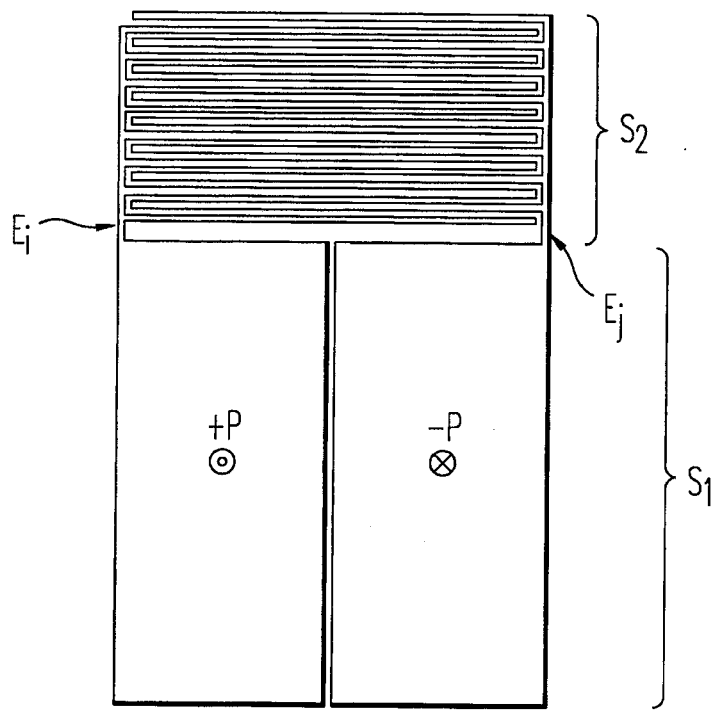
FIG. 4 exemplifies a card according to the invention using a comb of interdigitated electrodes to address the material of the structure $S_2$.
Figure 5:
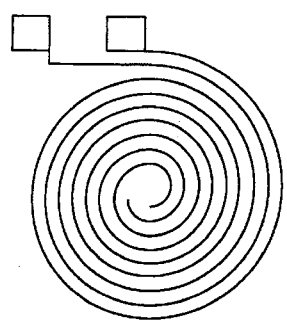
FIG. 5 exemplifies electrodes having a particular architecture to address the material of the structure $S_2$.
Figure 6:
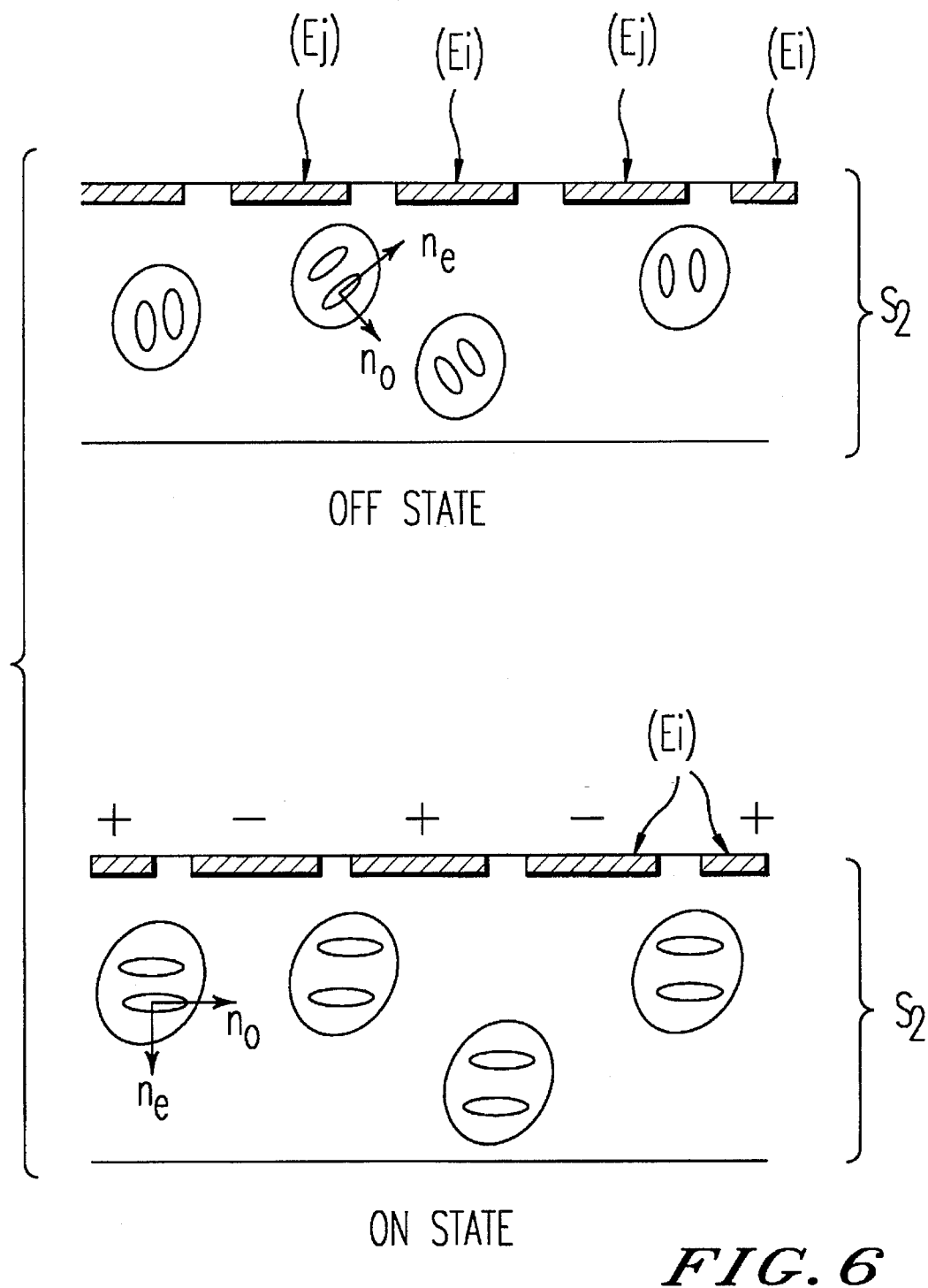
FIG. 6 gives a schematic view of the behavior of a polymer-based composite material in which liquid crystal globules are dispersed, this material being inserted into the exemplary card illustrated in FIG. 4.

It is also possible to make a grating formed by a network of interdigitated electrodes enabling the liquid crystal molecules to be oriented no longer perpendicularly to the plane of the substrates $P_1$ and $P_2$ but in parallel to said plane. FIG. 4 illustrates an exemplary card using electrodes of this type. To control the two series of electrodes $E_i$ and $E_j$, two types of domains of piezoelectric material with opposite polarizations +P and −P are made, these domains being located in one and the same plane and no longer in superimposed planes. With a configuration such as this, when the card is bent, horizontal electrical field lines appear. FIG. 5 illustrates another possible architecture of continuous electrodes, wherein the existence of only one defect in one of the electrodes means that the card-checking device can no longer be made to work. This characteristic makes it more difficult to forge the card according to the invention. FIG. 6 illustrates, in this respect, the behavior of the liquid crystal molecules subjected to such a field. One of the polarizations of light is transmitted while, on the contrary, the other one is scattered if the liquid crystal molecules are oriented perpendicularly to the substrate (the two polarizations are transmitted). In this case, there is an overlapping of a sharp image and a scattered image.

The device according to the invention may also advantageously comprise a phase grating made in the electrooptical material. In the case of a polymer matrix, it is possible to use microlithography techniques (with a pitch of a few microns) to make grooves in the polymer, filled with liquid crystal. The liquid crystal molecules, which are typically nematic crystals, are then oriented in the grooves made, being oriented in a horizontal plane. The liquid crystal may be chosen so that its ordinary index is equal to that of the polymer and so that its extraordinary index achieves the phase condition cancelling the 0 order diffraction. The incident light may be split up into two orthogonal polarizations of which it is the sum: these are one polarization parallel to the pitch of the grating and the other one perpendicular to this pitch.

Thus, one of the polarizations is not affected by the grating, the other one being diffracted mainly according to the +1 order diffraction and the −1 order diffraction along two directions $D_1$ and $D_2$.

By overlaying a second grating, orthogonal to the first one, on this grating the previously unaffected polarization is then diffracted in two directions $D'_1$ and $D'_2$ that are orthogonal to the directions $D_1$ and $D_2$, the other polarization going through the second grating without being modified.

This overlaying of gratings gives rise to four images. With this set of two crossed gratings, it is therefore possible to obtain electrical switching between a diffractive state without a zero order diffraction, creating four images, and a transparent state.

The flexible card according to the invention may also advantageously include an integrated logic circuit between the piezoelectric generator and the display element. This circuit may be programmed so as to create a smart response which may be of the flashing type, enabling the response expected during the card validity checking operations to be made more complex.

What is claimed is:

1. A flexible card provided with a validity-checking device comprising, inserted between flexible electrodes:

a structure $S_1$ comprising at least one layer of piezoelectric material;

a structure $S_2$ comprising a layer of material capable of switching electrically between two optical states (I) and (II) that are different in terms of ocular perception, said structures $S_1$ and $S_2$ being electrically connected.

2. A flexible card according to claim 1, wherein the structures $S_1$ and $S_2$ are juxtaposed.

3. A flexible card according to one of the claims 1 or 2, wherein the material capable of switching electrically between two different optical states is a polymer-based composite material type in which liquid crystal molecules are dispersed.

4. A flexible card according to any of the claims 1 or 2, wherein the structure $S_1$ comprises two polarized films $F_1$ and $F_2$ made of piezoelectric polymer material, the direction of polarization of said films being opposite.

5. A flexible card according to claim 4, wherein the piezoelectric polymer is of the polyvinylidene fluoride type.

6. A flexible card according to one of the claims 1 or 2, wherein the flexible electrodes on either side of the structures S1 and S2 are transparent flexible substrates covered with a transparent, conductive thin film.

7. A flexible card according to claim 2, wherein the structure S2 is inserted between a transparent continuous electrode and a grating of conductive lines made on a transparent, flexible substrate so as to define a diffraction grating.

8. A flexible card according claim 2, wherein the structure S2 is inserted between a transparent continuous electrode and a grating formed by interdigitated electrodes Ei and Ej, the structure s1 comprising, in one and the same plane, at least one set of two elements of piezoelectric material with +P and −P polarization respectively, the +P elements being connected to the electrodes Ei, the −P elements being connected to the electrodes Ej.

9. A flexible card according to claim 2, wherein the structure S2 has two phase gratings that are superimposed and crossed.

10. A flexible card according to claim 9, wherein the phase gratings are constituted by periodic inclusions of liquid crystal within periodically etched polymer films.

* * * * *